May 24, 1960 J. D. HOLLAND ET AL 2,938,077

RADIO TELEGRAPH SYSTEMS

Filed Feb. 21, 1958 2 Sheets-Sheet 1

Inventor
J.D. HOLLAND-R.A. BUCK
By [signature]
Attorney

May 24, 1960 J. D. HOLLAND ET AL 2,938,077

RADIO TELEGRAPH SYSTEMS

Filed Feb. 21, 1958 2 Sheets-Sheet 2

Inventor

J.D. HOLLAND - R.A. BUCK

By R.P. Morris

Attorney 2,938,077

RADIO TELEGRAPH SYSTEMS

John Douglas Holland and Robert Arthur Buck, London, England, assignors to International Standard Electric Corporation, New York, N.Y., a corporation of New York Filed Feb. 21, 1958, Ser. No. 716,763

Claims priority, application Great Britain Mar. 4, 1957

2 Claims. (Cl. 178—23)

The present invention relates to radio telegraph systems.

Automatic printing telegraph apparatus is frequently carried by aircraft to enable information to be supplied to the pilot from a ground station by a radio connection. Systems of this kind are susceptible to interference, and when the aircraft flies beyond the limit of the distance over which radio signals are satisfactorily received, or if the interference is severe, mistakes being to appear in the messages printed by the apparatus in the aircraft, due to the interference, which produces false signals. It is important that the pilot should be automatically warned when this situation arises, and this is achieved according to the broadest conception of the invention by measuring a structural characteristic of the received telegraph wave and performing a switching operation in accordance with the result of the measurement. More particularly, the rate at which signals are being received is effectively measured, and a switch is operated when the rate exceeds the normal rate at which the proper signals are received in the absence of interference. The switch may, for example, be arranged to operate an alarm signal and/or to disconnect the teleprinter or other machine which is used for receiving the message.

Figures 1, 2:
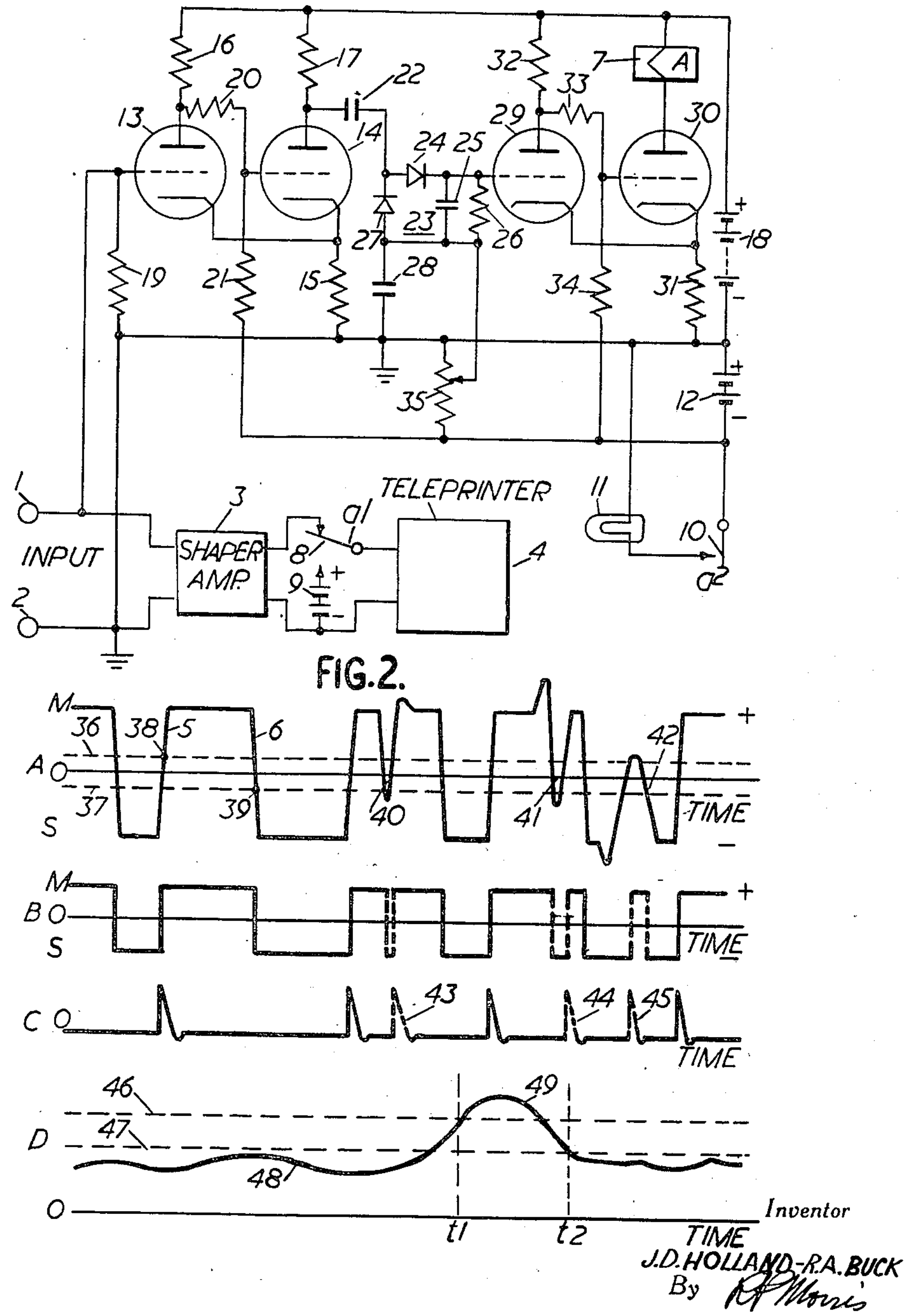
Figure 3:
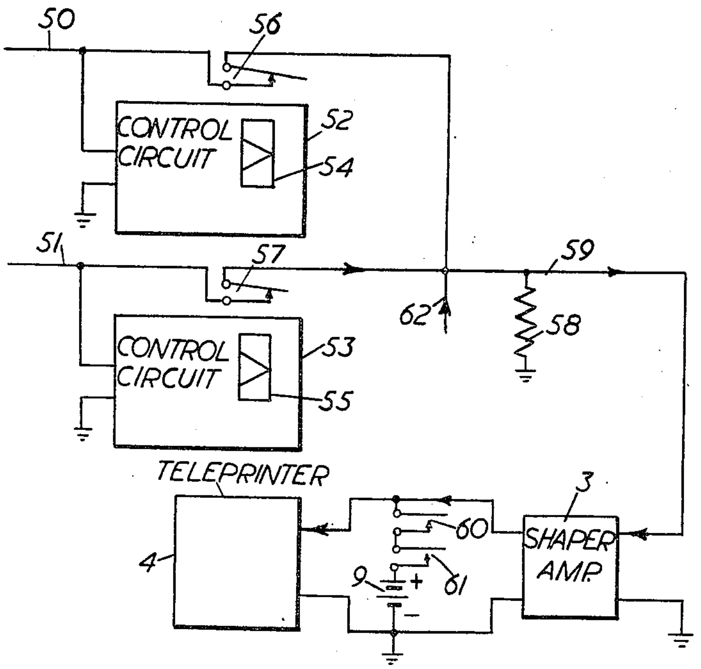

The invention will be described with reference to the accompanying drawing, in which Fig. 1 shows a schematic circuit diagram of an embodiment, Fig. 2 shows graphical diagrams used to explain the operation of Fig. 1, and Fig. 3 shows a schematic circuit diagram of another embodiment.

Referring to Fig. 1, a direct current wave representing marking and spacing signals is applied to the input terminals 1, 2. This wave is preferably obtained directly from the demodulator of the radio receiver (not shown). The wave is passed through shapers and D.C. amplifiers represented by the block 3, and thence to a teleprinter 4.

For clearness, it will be assumed that the wave applied to terminals 1 and 2 is a double-current wave shown by graph A, Fig. 2, in which marking periods are represented by a positive potential and spacing periods are represented by an equal negative potential. A change from negative potential to positive potential, as shown at 5, graph A, will be called a "marking signal," and an opposite change, as shown at 6, will be called a "spacing signal." The word "signals" unqualified will be understood to mean marking signals and spacing signals as just described. Graph A also shows the effects of interference, which will be explained below.

The input terminals 1 and 2 are also connected to a control circuit, in the upper part of Fig. 1, which effectively measures the rate at which signals are being received, and releases a normally operated relay 7, designated A, when the said rate increases abnormally. This relay has a set of change-over contacts 8, designated *a*1, shown detached from the winding A for clearness. Under normal conditions, when the relay 7 is operated, the contacts 8 are in the position shown, so that the teleprinter is connected to the shaper and amplifier circuits 3. If the interference causes the rate at which the signals are received to be abnormally increased, the relay 7 is released, and the contacts 8 change over to the position opposite to that shown, disconnect the teleprinter 4 from the circuits 3, and connect it instead to a source 9 of positive marking potential which holds the teleprinter in the stop condition.

A second set of detached contacts 10 controlled by the relay 7, designated *a*2, is also shown. Under normal conditions, the contacts 10 are held open, as shown, but when the relay 7 is released, the contacts 10 close and connect an alarm lamp 11 across a direct current source 12, which is used also as a bias source for the control circuit.

A clear distinction should be made between the "telegraph speed," which is the number of code element periods per second (e.g. 50), and the rate at which signals are received. This last-mentioned rate will be defined as the number of signals received per second averaged over a predetermined sufficiently long period. Thus if during a predetermined period of N seconds the number of signals received is $n$, then the rate at which signals are received will be $n/N$ signals per second. The predetermined period N to be chosen depends on the nature of the signals, and for teleprinter signals, at a telegraph speed of 50 bauds, a suitable value for N is 60 secs. In the case of the ordinary teleprinter binary code at this speed, the mean rate at which signals are received is about 13 signals per second.

The control circuit comprises a conventional two-condition trigger circuit consisting of two valves 13, 14, the cathodes of which are connected in common to ground through a resistor 15. The anodes are connected through respective resistors 16 and 17 to a high-tension direct-current source 18, the negative terminal of which is connected to ground. The input terminal 2 is connected to ground, and terminal 1 is connected to the control grid of the valve 13, which is also connected to ground through a leak resistor 19. The anode of the valve 13 is connected to the control grid of the valve 14 through a resistor 20. The last-mentioned control grid is connected through a leak resistor 21 to the negative terminal of the bias source 12, the positive terminal of which is connected to ground.

The condition of the valves 13 and 14 is such that the valve 13 is conducting, and the valve 14 is cut off, when positive marking potential is applied to terminal 1; and such that the valve 13 is cut off and the valve 14 is conducting when negative spacing potential is applied to terminal 1.

The anode of the valve 14 is connected through a differentiating capacitor 22 to a storage circuit 23 which effectively measures the rate at which the signals are being received. It comprises a first rectifier 24 which connects the capacitor 22 to a storage capacitor 25 shunted by a resistor 26. The time constant of the elements 25 and 26 may, for example, be about 0.2 second. The rectifier 24 is directed so that it will pass positive pulses to the storage capacitor 25, which is large compared with capacitor 22. A second rectifier 27 connects the capacitor 22 to ground through a capacitor 28 which is also large compared with capacitor 22. The rectifier 27 is directed to accept negative pulses which are thereby diverted to ground. The junction point of elements 27 and 28 is directly connected to the lower ends of elements 25 and 26 as shown.

The rectifiers 24 and 27 may for example, be thermonic diodes, or suitable dry-plate or crystal rectifiers.

The upper ends of elements 25 and 26 are connected to the control grid of a valve 29 which, with a valve 30, forms a second two-condition trigger device similar to that associated with the valves 13 and 14. It comprises elements 31, 32, 33 and 34 similar, and similarly arranged, to the elements 15, 16, 20 and 21 respectively. The winding of the relay 7 is connected in series between the anode of the valve 30 and the source 18, and corresponds to the resistor 17.

The lower end of the element 26 is connected to the adjustable contact of a potentiometer 35, which is connected across the bias source 12, and which provides an adjustable negative bias potential for the control grid of the valve 29. The resistance of the potentiometer 35 should be small compared with that of resistor 26.

The trigger circuit associated with the valves 13 and 14 is employed as a limiter to produce a substantially rectangular wave of constant amplitude, like that shown in graph B, Fig. 2, from the telegraph wave shown in graph A, the amplitude of which is liable to be variable. The positive and negative triggering levels of the valves 13 and 14 are represented in graph A by the dotted lines 36 and 37, which are equally spaced from the zero voltage axis by a voltage small compared with the voltage amplitude of the telegraph wave. Thus for marking signals, the valves 13 and 14 switch over to the marking condition (valve 13 conducting) at the voltage represented by the point 38, and for spacing signals they switch over to the spacing condition (valve 14 conducting) at the voltage represented by the point 39.

The variations of the anode voltage of the valve 14 are differentiated by the capacitor 22 and resistor 26, so that a short positive differential pulse is supplied to the storage circuit 23 in response to a marking signal, and a short negative differential pulse is supplied in response to a spacing signal. The negative differential pulses are suppressed by the rectifier 27.

The positive differential pulses produced in response to the telegraph wave shown in graph A of Fig. 2 are indicated in graph C.

Graph A shows a number of additional signals at 40, 41 and 42, which are due to interference, and which cut across the triggering levels 36 and 37 during normal marking or spacing periods. These additional signals will introduce mistakes into the messages printed by the teleprinter 4 (Fig. 1). The corresponding additional signals are shown dotted in graph B. Each additional marking signal produces a corresponding positive differential pulse, the extra pulses being shown dotted in graph C and being designated 43, 44 and 45. Thus it will be seen from graph C, that in the section of the telegraph wave shown in graph A, there are four normal pulses corresponding to real signals and three additional pulses corresponding to false signals due to the interference.

The differential pulses shown in graph C are applied to charge up the storage capacitor 25 (Fig. 1) through the rectifier 24, and the potential which the capacitor acquires depends on the number of differential pulses which occur per second. If no signals are being received, the valve 29 is cut off by the negative bias potential supplied from the potentiometer 35, so that the valve 30 conducts and holds the relay 7 operated. The connection between the teleprinter 4 and the shaper and amplifier circuits 3 is maintained by the contacts 8 as shown, and lamp 11 is disconnected by the open contacts 10. As soon as signals begin to be received, the storage capacitor 25 charges up so that a positive potential is applied to the control grid of the valve 29 in opposition to the negative bias potential derived from the potentiometer 35; and if the number of marking signals received per second increases above a certain limit the potential applied to the control grid of the valve 29 increases above the triggering threshold, and the valves 29 and 30 switch over so that the valve 30 is cut off and releases the relay 7, thus disconnecting the teleprinter 4 and lighting the alarm lamp 11.

This will be understood from graph D of Fig. 2, which shows the time variation of the potential of the control grid of the valve 29 in relation to the two triggering voltage levels 46, 47, with respect to ground potential, of the trigger circuit associated with the valves 29 and 30. Normally the grid potential will vary a little below the lower triggering level 47 as indicated by the portion 48 of the curve. The valve 29 (Fig. 1) remains cut off and the relay 7 remains operated. However just before the time $t_1$, the interference is supposed to increase sufficiently to introduce extra signals, and at $t_1$ the curve crosses the upper triggering level 46, and the valves 29, 30 are switched over, and the relay 7 is released. During the period while the portion 49 of the curve lies above the triggering level 46, the interference continues to be appreciable, and the relay 7 remains released. However by the time $t_2$, the interference has decreased again and the curve crosses the lower triggering level 47. The valves 29 and 30 are then switched back again and the relay 7 is re-operated, thereby reconnecting the teleprinter 4 and extinguishing the alarm lamp 11.

The difference between the triggering levels 46 and 47 introduces a time lag into the restoration of the circuit after the interference has decreased below the limit at which extra pulses are produced, and so this difference should be made as small as is practicable.

It will be evident that the storage circuit 23 integrates the differential pulses shown in graph C, Fig. 2. The potential acquired by the capacitor 25 for a given rate of reception of the signals depends on the time constant of the elements 25 and 26, which should be suitably chosen in relation to the predetermined period N seconds over which the number of received signals is averaged.

The point at which the valves 29 and 30 switch over may be set by suitable adjustment of the potentiometer 35.

In the case of teleprinter signals representing ordinary messages at a speed of 50 bauds, it can be shown that the number of marking signals per second varies between 11 and 15, with an average of about 13. Thus the potentiometer 35 may, for example, be adjusted so that when the number of marking signals reaches about 17 per second the valves 29 and 30 are switched over, thus releasing the relay 7. It is then assumed that the extra signals are due to interference.

It should perhaps be mentioned that in some teleprinter systems the characters R and Y may be transmitted alternately for testing purposes. In this case the normal number of marking signals per second increases to 18, and if this test signal is used, the adjustment of the potentiometer 35 should be made so that the relay 7 is not released until the number of marking signals received increases to, say, 19 per second.

It may be useful to point out that if the input at terminals 1 and 2 consists of atmospheric noise only within a bandwidth of 100 cycles per second, without any telegraph signals, and if the triggering levels 36 and 37 (graph A, Fig. 2) are chosen well within the noise amplitude range, the number of false marking signals produced thereby may increase to between 50 and 55 per second.

The above figures have been quoted to give some idea of the conditions which may be met, but it will be understood that in other circumstances a different adjustment may be preferable.

It should be understood that the alarm lamp 11 could be replaced by any other kind of alarm device or that the lamp 11 and contacts 10 could be omitted, since the stopping of the teleprinter 4 may itself be sufficient notice that the interference has increased beyond tolerable limits. It may be mentioned, however, that the stopping of the teleprinter 4 may also be due to the fact that no signals are being transmitted from the teleprinter at the ground station for the time being. If it is desired to distinguish between the two possibilities, the alarm lamp 11 is useful, since it will only be lighted if the interference is excessive. During the idle period a constant voltage is transmitted to hold the teleprinter 4 in the stopped condition, but if during this period the noise increases excessively the teleprinter will be disconnected, as before.

It may also be mentioned that in case it is preferred not to disconnect the teleprinter automatically, the contacts 8 and holding source 9 may be omitted, the teleprinter 4 being permanently connected to the shaper and amplifier circuit 3. Then the alarm lamp 11 (or other alarm device) gives the necessary warning of the increase of the interference.

It should be noted that while a teleprinter has been assumed as the telegraph receiving machine, an undulator, or some other kind of printer or receiving machine could be used instead. It is evident also that various minor modifications of the arrangement could be adopted, such for example as counting the spacing signals instead of the marking signals to control the relay 7, as will be understood by those skilled in the art.

It should be explained that the measurement of the rate at which marking or spacing signals are received can be regarded as a measurement of a structural characteristic of the telegraph wave, namely the frequency with which it crosses the zero axis.

A further point to note is that the percentage increase in the rate at which signals are received due to interference of a given level is substantially independent of the telegraph speed because the bandwidth increases proportionally to the speed, and so the number of additional false signals produced by the interference also increases proportionally to the telegraph speed.

It should be mentioned that although it has been assumed that the signals applied to terminals 1 and 2 of Fig. 1 are double-current signals, the arrangement may evidently be adapted for single-current signals by applying an appropriate direct-current bias to the valve 13.

It is well known to employ space or frequency diversity arrangements for improving the reception under fading and noisy conditions. In this case the outputs of several separate radio receivers carrying the same telegraph signals are combined according to some principle whereby the best use is made of all the received signals. The present invention may be adapted for simplifying such diversity receiving arrangements, as shown in Fig. 3. The same telegraph signals (like graph A, Fig. 2) from each of two separate diversity radio receivers (not shown) are applied respectively to conductors 50 and 51, to which are also respectively connected two similar control circuits represented as blocks 52 and 53, each of which comprises the elements shown in the upper part of Fig. 1. Only the relays 54 and 55 (which correspond to relay 7 in Fig. 1) are shown in the blocks 52 and 53. The relays 54 and 55 hold the respective contacts 56 and 57 normally closed, by which contacts conductors 50 and 51 are connected in multiple to a combining resistor 58. The combined signals are delivered over conductor 59 to the shaper amplifier 3 and teleprinter 4 as in Fig. 1. The holding source 9 is connected to the teleprinter 4 through two sets of contacts 60 and 61 in series, held normally open by the relays 54 and 55 respectively.

It will be seen that if the noise accompanying the signals supplied over conductor 50, for example, becomes excessive, relay 54 will be released and will disconnect conductor 50 from conductor 59 by opening the contacts 56; but the teleprinter 4 will continue to be operated by the signals from conductor 51. At the same time contacts 60 will be closed, but will have no effect since contacts 61 are still open.

If, however, the noise accompanying the signals on both conductors 50 and 51 is excessive, both will be disconnected from conductor 59. The teleprinter 4 now receives no signals, but now both sets of contacts 60 and 61 will be closed, and the teleprinter will be held in the stopped condition by the source 9.

It will be understood that more than two diversity receivers may be connected in the same way, in parallel to the conductor 59 at the point indicated by the arrow 62, by providing additional control circuits (not shown) arranged similarly to 52 and 53. Additional normally open sets of contacts (not shown) will be connected in series with the contacts 60 and 61, so that only in the case when the noise is excessive in all the diversity receivers, and all of them are disconnected from conductor 59, will the stopping source 9 be connected to the teleprinter 4.

While the principles of the invention have been described above in connection with specific embodiments, and particular modifications thereof, it is to be clearly understood that this description is made only by way of example and not as a limitation on the scope of the invention.

What we claim is:

1. A telegraph recording circuit arrangement for received telegraph waves consisting of alternate marking and spacing signals of irregular duration, said signals having been transmitted at a given rate and subject to mutilation by interfering signals, comprising in combination: a message recording machine; means connecting said machine in responsive relationship to said received waves; means responsive to said received waves for detecting the presence of said interfering signals when the rate of reception of said interfering signals exceeds the rate of reception of said marking and spacing signals by a predetermined amount and means responsive to said detecting means for rendering said machine non-responsive to said received waves.

2. A receiver for telegraph waves in accordance with claim 1 wherein said detecting means comprises amplifying and clipping means for producing a square wave from the combined telegraph signals and interfering voltages; means for differentiating and rectifying said square wave to produce a series of voltage pulses of a given sign; storage means to acccumulate a potential proportional to the number of said pulses; a reference potential of opposite sign to that of said pulses and means responsive to both stored potential and reference potential when the rate of reception of said interfering signals exceeds the reception rate of said marking and spacing signals by said predetermined amount.

References Cited in the file of this patent

UNITED STATES PATENTS

| | | |
|---|---|---|
| 2,403,615 | Sanders | July 9, 1946 |
| 2,432,292 | Deal | Dec. 9, 1947 |
| 2,750,500 | Aiken | June 12, 1956 |
| 2,789,217 | Lacy | Apr. 16, 1957 |

FOREIGN PATENTS

| | | |
|---|---|---|
| 629,829 | Great Britain | Oct. 31, 1951 |